(12) United States Patent  
Stever

(10) Patent No.: US 6,652,907 B1  
(45) Date of Patent: Nov. 25, 2003

(54) METHOD OF COLORING AND MASKING CONCRETE USING PEELABLE ADHESIVE

(76) Inventor: Leslie J. Stever, 1061 Hillside Ave., Lansdale, PA (US) 19446

( * ) Notice: Subject to any disclaimer, the term of this patent is extended or adjusted under 35 U.S.C. 154(b) by 7 days.

(21) Appl. No.: 10/004,643

(22) Filed: Dec. 7, 2001

(51) Int. Cl.7 .................................................. B05D 1/32
(52) U.S. Cl. ........................ 427/154; 427/259; 427/260; 427/261; 427/264; 427/287; 427/421; 427/427
(58) Field of Search ........................ 427/154, 259–261, 427/264–266, 282, 287, 403, 421, 427

(56) References Cited

U.S. PATENT DOCUMENTS

| | | | |
|---|---|---|---|
| 3,930,740 A | 1/1976 | Bowman | 404/93 |
| 4,889,666 A | 12/1989 | Kawasaki | 264/22 |
| 4,946,505 A | 8/1990 | Jungk | 106/712 |
| 5,143,949 A * | 9/1992 | Grogan et al. | |
| 5,215,402 A | 6/1993 | Stowell et al. | 404/93 |
| 5,502,941 A | 4/1996 | Zember et al. | 52/314 |
| 5,534,214 A | 7/1996 | Sakamoto et al. | 264/333 |
| 5,735,094 A | 4/1998 | Zember | 52/314 |
| 5,942,072 A | 8/1999 | McKinnon | 156/247 |
| 6,150,075 A | 11/2000 | Klafert | 430/320 |
| 6,253,515 B1 | 7/2001 | Kuelker | 52/506.05 |
| 6,444,077 B1 * | 9/2002 | Fennessy | |
| 6,464,823 B1 * | 10/2002 | Vantyle | |

FOREIGN PATENT DOCUMENTS

GB      2 265 404      *    9/1993

OTHER PUBLICATIONS

Semco, Inc., *Pre–Stain System*, 2 Pages. No date.
Protective Products International, Inc., *Scratch Protection*, Jan. 23, 1996, 4 Pages.

* cited by examiner

*Primary Examiner*—Fred J. Parker
(74) *Attorney, Agent, or Firm*—Michael F. Petock, Esq.

(57) ABSTRACT

A method, kit and tool for decorative coloring of concrete utilizes the application of a releasable adhesive compound to a cementitious substrate to prevent coloring in particular areas. Various designs may be created by the releasable adhesive compound. Releasable adhesive compound may be applied from a caulk gun in the form of a releasable caulk using either freehand, a template to form dots to be connected together, or a stencil. Alternatively, the releasable adhesive compound may be in the form of a liquid which may be sprayed or brushed on to the surface. A coloring agent is applied and the releasable adhesive compound, particularly when it is in the form of a caulk, may be used to dam the coloring agent. A guide tool for making straight lines or particular designs uses a transparent guide surface mounted to a body which is raised by projections.

56 Claims, 7 Drawing Sheets

METHOD OF COLORING AND MASKING CONCRETE USING PEELABLE ADHESIVE

FIELD OF THE INVENTION

The present invention relates to a method, kit and tool for decorative coloring of concrete. More particularly, the present invention relates to a method, kit and tool for decorative coloring of concrete wherein various designs may be formed with the same or different colors on a cementitious substrate by applying a releasable adhesive compound, which may be removed after coloring.

BACKGROUND OF THE INVENTION

There has been a desire for some time to produce colored concrete to improve the decorative appearance of concrete. For example, U.S. Pat. No. 3,930,740—Bowman discloses tools for imprinting non repeating stone patterns in fresh concrete to which color is added. The Bowman patent was issued in 1976.

More recently, an effort has been made by Zember as disclosed in U.S. Pat. No. 5,735,094 issued Apr. 7, 1998. Zember discloses a process for applying an ornamental coating comprised of liquid mortar which includes a color pigment. Zember discloses in his process the use of a template for defining a pattern of grout lines which is adhesively bonded to a substrate, the mortar applied, and then the template removed to provide the appearance of grout lines.

These prior art efforts have been directed to applying a coloring agent to a freshly applied cementitious material.

SUMMARY OF THE INVENTION

The present invention may be utilized to apply decorative colored designs simulating brick, flagstone, tile or other designs on horizontal, vertical and all other angles in between of surfaces. The cementitious substrates to which the colored designs may be applied include concrete, cement overlays, toppings, texture sprays, mortar or any other cementitious material.

Briefly, in accordance with the present invention, a method of coloring a cementitious substrate includes the steps of applying a releasable adhesive compound in a selected design to areas of the cementitious substrate which are desired not to be colored. The next step is applying one or more coloring agents to areas of the cementitious material desired to be colored. The releasable adhesive compound may be a releasable caulk which may be applied by freehand, may be applied to connect dots provided by a template, or may be provided to fill openings in a stencil. Alternatively, a releasible adhesive compound which may be brushed or sprayed onto the surface or selected areas may be utilized. Where a caulk gun is utilized to form mortar lines between areas which may correspond to various designs, such as flagstone mortar joints, different coloring agents may be applied between the caulk lines, with the caulk lines acting as a dam to prevent coloring agents from flowing beyond a particular area. Different coloring agents may be utilized in different dammed areas. Once the cementitious substrate is colored, the releasable adhesive compound may be removed from the cementitious substrate either before or after sealing the cementitious substrate.

If it is desired to produce the appearance of mortar joints having a different color than the natural color of the cementitious substrate, such as concrete, the cementitious substrate may be sealed with a sealing compound prior to removal of the releasable adhesive compound. After sealing and after removal of the releasable adhesive compound, the mortar joints may be colored with a coloring agent of a different color to produce the desired coloring effect.

Where a stencil is utilized, the releasable adhesive compound may be in liquid form which may be brushed or sprayed over the stencil. The releasible adhesive compound solidifies, and may be removed in a manner similar to the releasable caulk.

In forming the dots which may be connected together by the releasable caulk, a template may be utilized having holes spaced a reasonable distance apart, perhaps 6 to 8 inches apart.

In using the method of the present invention to create the appearance of ceramic tiles or bricks with grout or mortar joints therebetween, the selected design may be formed by using one or a plurality of materials having the selected building design, i.e. ceramic tile, brick or the like, in spaced relationship on the cementitious surface. In carrying out this method, one, and preferably a plurality of materials having the desired building material design, would be applied to the cementitious surface in spaced relationship. The plurality of materials would have a self sticking surface for releasable adhesion to the cementitious surface. The spaced relationship between the plurality of materials would correspond to the typical spacing of grout of mortar joints. The releasable adhesive compound would be applied in the spaces between the materials corresponding to the grout or mortar joints. The plurality of materials would then be removed and a coloring agent would be applied to the areas of cementitious surface where the plurality of materials were removed. After the stain is dried or cured, the releasable adhesive compound would be removed.

The present invention also includes a kit for coloring a cementitious substrate in accordance with the method. This kit would include at a minimum a releasable adhesive compound and one or more coloring agents. The kit may also include a straight edge or a guide edge for forming particular designs on the cementitious substrate. The kit may also include a liquid brushable or sprayable releasable adhesive compound, and may include one or more stencils. The kit may also include one or a plurality of materials having a selected building material design, such as ceramic tile or brick, with a self sticking surface for releasable adhesion to a cementitious surface. The self sticking surface may be covered with a removable cover sheet prior to use.

The present invention is also directed to the tool for guiding a caulk gun which contains the releasable adhesive compound. This guide tool may be straight edge or have various designs such as that of a key. The guide tool is provided with a transparent guide member which allows for ease of use. The guide tool is provided with projections to keep the guide tool raised from the cementitious substrate during use.

BRIEF DESCRIPTION OF THE DRAWINGS

For the purpose of illustrating the invention, there are shown in the drawings forms which are presently preferred; it being understood, however, that this invention is not limited to the precise arrangements and instrumentalities shown.

DETAILED DESCRIPTION OF THE PREFERRED EMBODIMENTS

Figure 1:
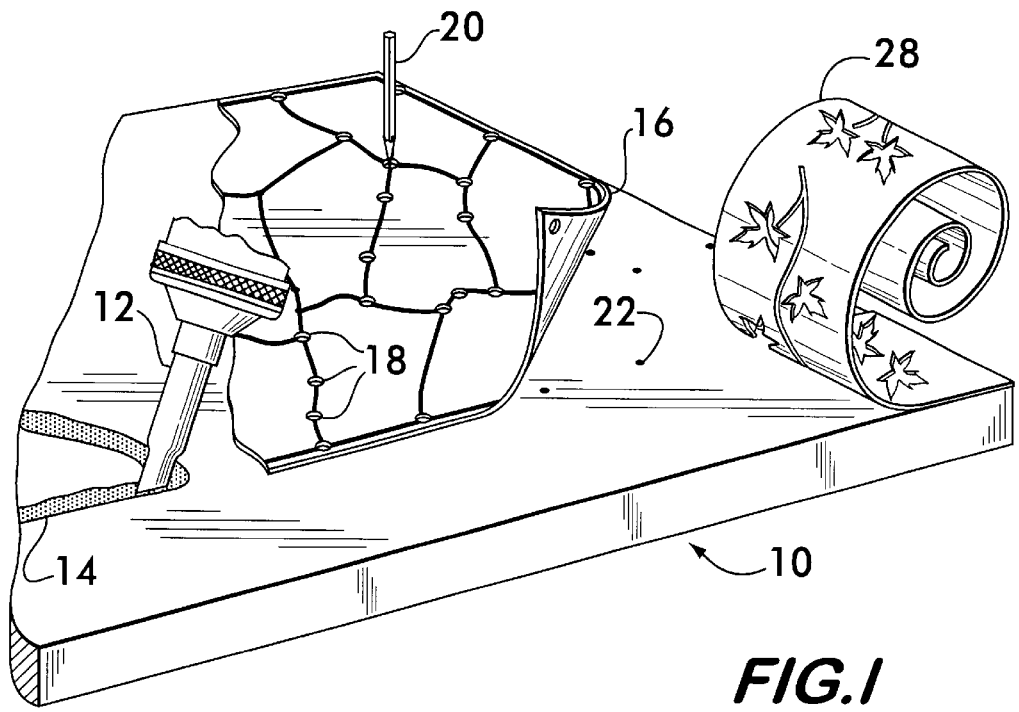
FIG. 1 is a view in perspective of a cementitious substrate to be colored showing thereon freehand use of a caulk gun applying a releasable adhesive compound, a template with holes therein to enable marking dots for a pattern to be formed by the connection of the dots with the releasable adhesive compound and a stencil being applied to the substrate.

Referring now to the drawings, wherein like numerals indicate like elements, there is shown in FIG. 1 a cementitious substrate 10 which is desired to be colored. Throughout, cementitious substrate is defined to include any surface comprised of a cementitious material including, but not limited to, concrete, cement overlays, toppings, texture sprays and the like. A cement overlay is a slurry type mixture of cement, sand and polymers. The mix is poured over existing concrete, wood, asphalt, etc. typically at anywhere from 1/32 of an inch up to 2 inches thick. It forms a hard concrete like surface that can be stamped, colored and/or textured. Toppings are a cementitious blend of materials of a water like consistency that is poured over an existing floor. It is self leveling and forms an even flat surface, ready for coloring. A texture spray is a cementitious base material that is sprayed from an air powered hopper or gun to give various surface textures to existing floors, etc. The cementitious substrate may be in any orientation from horizontal to vertical. As will be illustrated with respect to FIGS. 6–8, the present invention in equally applicable to vertical surfaces. The cementitious substrate, particularly when concrete, may be any type of a floor, walk, driveway or other horizontal surface or any type of a vertical surface such as a concrete wall or any slanted surface.

Referring now more particularly to FIG. 1, there is shown in FIG. 1 a caulk gun 12 applying a releasable adhesive compound 14 to cementitious substrate 10. As illustrated in FIG. 1 by caulk gun 12, the design is being formed by freehand, that is without the use of a guide, template or stencil. The releasable adhesive compound 14 being applied by caulk gun 12 may be any suitable caulk which has sufficient adhesion to adhere to a surface, but may be removed after it is cured by peeling it from the surface. Such caulks are commercially available and may have been used previously for sealing doors and windows during the winter season where the caulk may be readily removed that following summer. One such caulk is sold by DAP Inc. under the trademark "SEAL'N PEEL®" and is a presently preferred removable adhesive caulk compound to be utilized to prevent staining in certain areas. Another removable caulk that is commercially available is sold by Red Devil, Inc. under the trademark "Zip-A-Way."

Also illustrated in FIG. 1 is a template 16 which may be utilized as an aid in forming the lines of caulk on cementitious substrate 10 by connecting together with the caulk the dots formed by the use of a template. Template 16 is provided with a plurality of holes 18, which may be any suitable reasonable distance apart, but in a presently preferred embodiment are about six to eight inches apart. A pencil or other marker 20 is utilized to make markings 22 on cementitious substrate through holes 18. Markings 22 may be connected together by means of a releasable adhesive compound in the form of a caulk 24 using caulk gun 26. Template 16 may be constructed of any suitable sheet material by drawing lines corresponding to the mortar joint or grout lines of a surface and punching holes through these lines a reasonable distance apart and at junctions such that they may be readily connected freehand by the releasable adhesive caulk bead. In a presently preferred embodiment, the holes are spaced no more than 6 to 8 inches apart. Templates may be made of various other designs, and do not need to correspond to mortar joints or grout lines, for example, see the design illustrated in FIGS. 6 through 8.

A stencil may also be used in the process. As illustrated in the embodiment shown in FIGS. 1 through 5, a stencil is used in conjunction with the template. However, it is understood that a stencil or a template may be utilized alone. For example, if only a flagstone design is desired for the entirety of the cementitious substrate, only a template may be utilized. Alternatively, if only particular designs are desired to be formed using a stencil, only a stencil may be desired. In the particular illustration, a template and a stencil are utilized together, the template being utilized to form a flagstone design and the stencil being utilized to form a stencil border pattern. FIG. 1 illustrates stencil 28 being applied to cementitious substrate 10.

Figure 2:
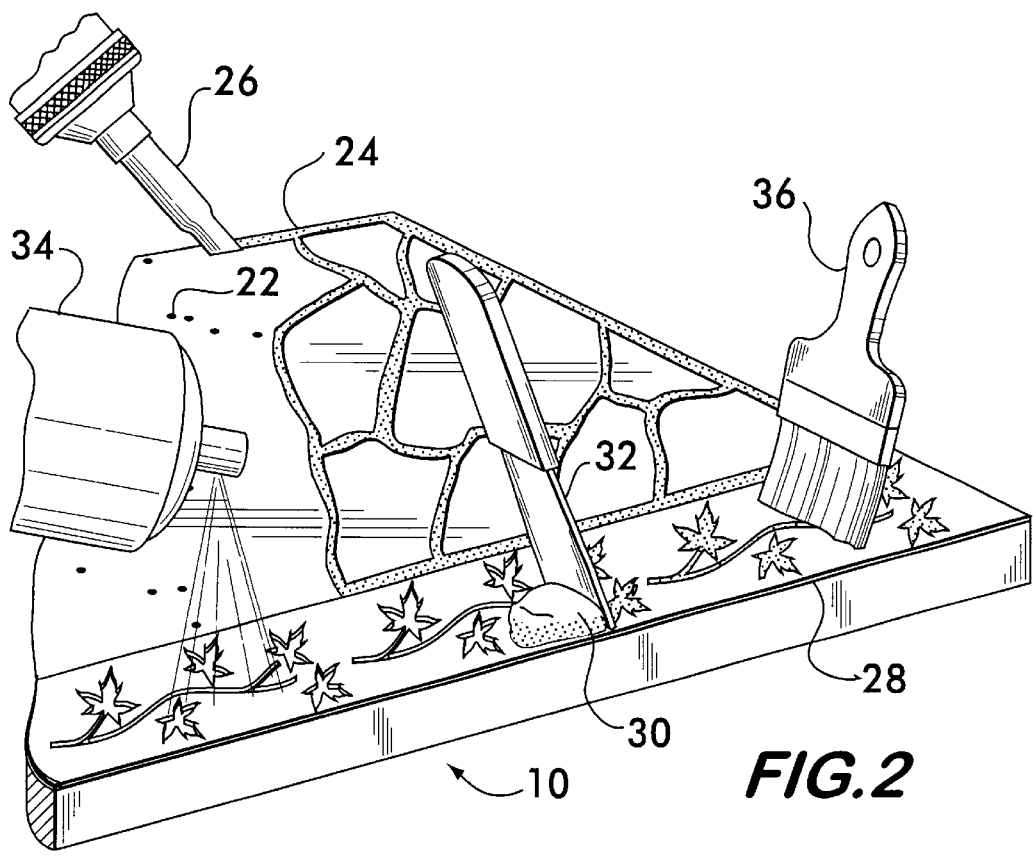
FIG. 2 is a view in perspective of a cementitious substrate showing a caulk gun applying a releasable adhesive compound to the substrate connecting the dots formed using the template, and the application of a releasable adhesive compound through openings in a stencil wherein the releasable adhesive compound may be caulk or a brushable or sprayable liquid.

Referring now more particularly to FIG. 2, the connection of the dots 22 utilizing removable adhesive compound in the form of caulk 24 by means of caulk gun 26 has already been discussed. A removable releasable compound is also applied through the openings in stencil 28 in FIG. 2. The releasable adhesive compound may be a caulk 30 applied by any suitable spreading tool, such as putty knife 32 as illustrated in FIG. 2. Alternatively, a liquid releasable adhesive compound may be applied through the openings in the stencil by means of a spray can 34 or a brush 36. The liquid releasable adhesive compound may be any suitable liquid releasable adhesive compound which may be applied to a surface and when cured has sufficient adhesive ability to remain on the surface, but which may be readily peeled off of the surface without difficulty substantially as a unit. Such a product is commercially available under the name "SCRATCH PROTECTION™" from Protective Products International, Inc. of Wavconda, Ill. Scratch Protection is the presently preferred liquid releasable adhesive compound. Scratch Protection has been used as a one time protective coating used to protect tubs, whirlpools, shower stalls and bases and other surfaces from getting scratched or damaged during construction. However, it is understood that other suitable liquid releasable adhesive compound may be utilized. Any such liquid compound may be applied in any suitable manner such as by use of a spray can, brush, roller or the like, such that the liquid releasable adhesive compound cures to form a coating which is impenetrable to the coloring agent and which may be readily removed thereafter by peeling it off substantially as a unit or in large segments. However, it is presently preferred that the releasable adhesive compound be one which may be applied at ambient temperatures such as the aforesaid releasable adhesive caulk to the removable scratch protectant.

Figure 3:
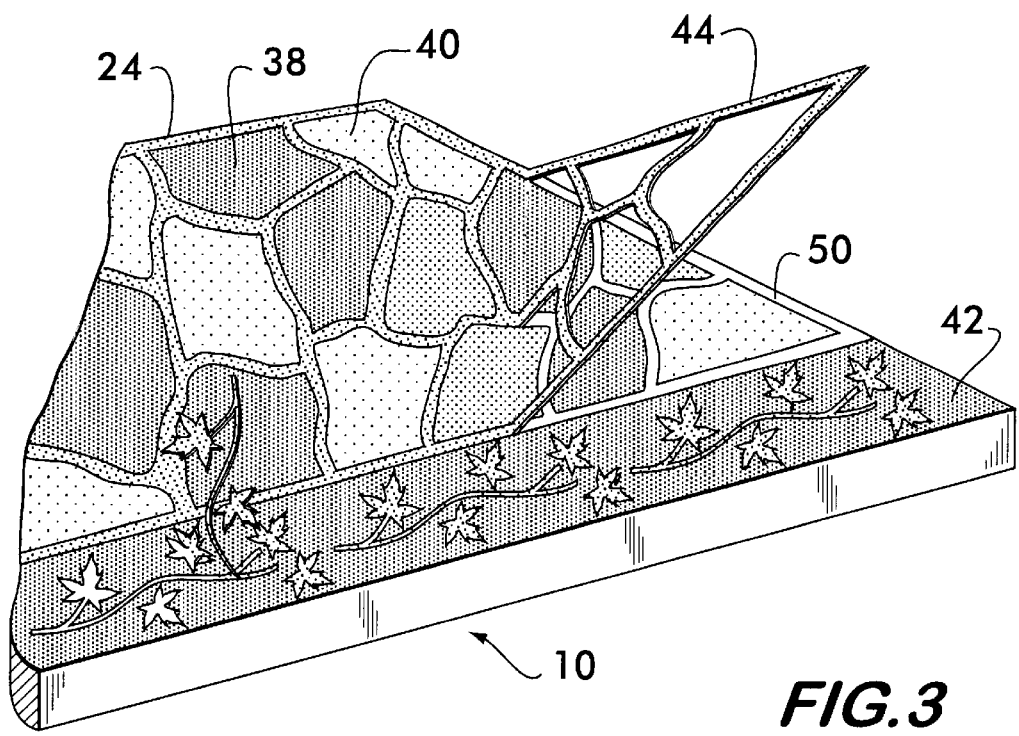
FIG. 3 is a view in perspective of a cementitious substrate wherein various stains have been applied wherein the stained surface may or may not have been sealed and the releasable adhesive compound is being removed.

Once the releasable adhesive compound has been applied to the cementitious substrate, a suitable coloring agent may be applied to the cementitious substrate, particularly in the areas which have not been covered by the releasable adhesive compound. Any suitable coloring agent may be utilized such as acid stains, chemical stains, water based stains and surface coatings. One suitable water based stain is commercially available from Semco, Inc. of Las Vegas, Nev. under the tradename "PRE-STAIN SYSTEM™." As illustrated in FIG. 3, different colors of coloring agents may be utilized in different areas, for example to create a flagstone pattern. More specifically, in FIG. 3, a coloring agent of one color may be applied to area 38 and a coloring agent of a different color may be applied to area 40, thereby producing the appearance of different colored stones which would create a pleasing flagstone appearance. The coloring agent, particularly one that is a liquid, may be dammed by the releasable adhesive compound in the form of releasable adhesive caulk 24. A coloring agent of a selected color, which may be the same as or different from colored areas 38 and 40 are applied to area 42 where the releasable adhesive compound had previously been applied through openings in stencil 28.

Figure 5:
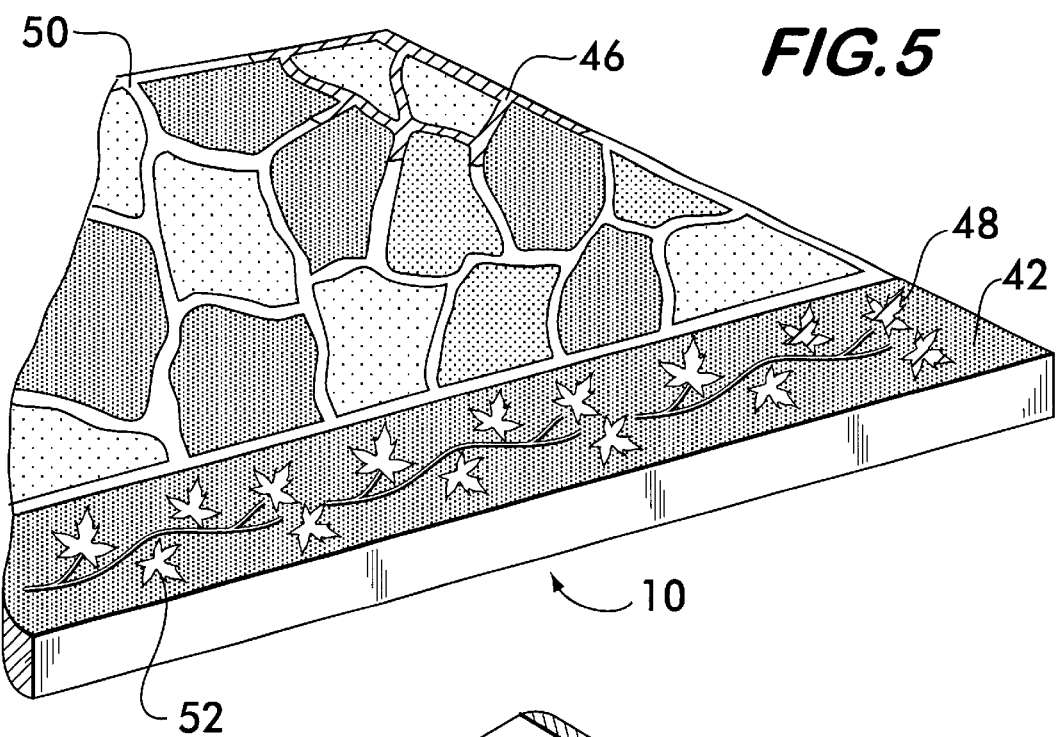
FIG. 5 is a view in perspective showing a completed colored cementitious substrate wherein there is illustrated portions of the surface previously covered by a releasable adhesive compound being provided with another coloring agent.

If the natural color of the cement is desired to show where the releasable adhesive compound had been, such as mortar joints between areas 38 and 40, releasable adhesive compound may be removed by peeling it off as shown at 44. The entire cementitious substrate may then be sealed. Alternatively, if it is desired to color the ares previously colored by the releasable adhesive compound with a different color, such as might be used to illustrate a colored mortar or grout joint, then the cementitious substrate would be sealed prior to removal of the releasable adhesive compound. After the cementitious substrate is sealed, then the releasable adhesive compound would be removed as illustrated at 44 in FIG. 3. The area which represents a mortar joint or grout could then be colored with a different or selected color as illustrated at 46 in FIG. 5. Similarly, in the border area 42 on which a stencil was utilized, the area of leaf design 48 may be provided with a coloring agent of a different color as illustrated at 48 in FIG. 5. FIG. 5 illustrates the finished product wherein the areas representing mortar or grout joints or floral designs may not be colored at 50 or may be colored as illustrated at 46. Similarly in the border area, floral designs 52 illustrate an uncolored or natural cementitious substrate color and the area 48 illustrates where a coloring agent of another color has been applied to the area which was previously covered by the releasable adhesive compound during the first coloring process.

Figure 4:
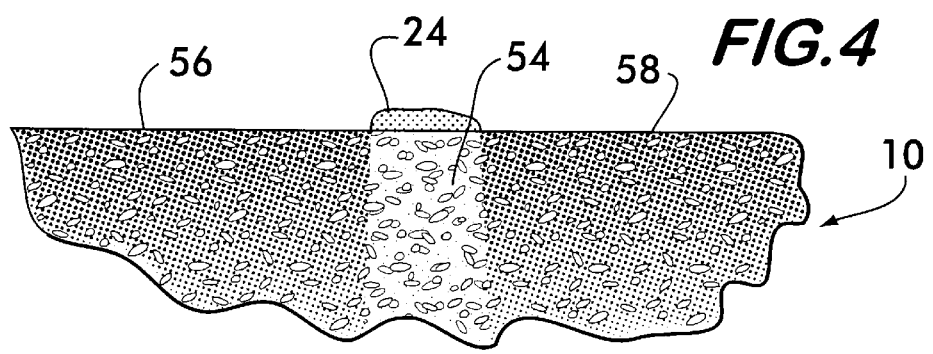
FIG. 4 is a cross sectional view showing stained portions of a cementitious substrate with a releasable adhesive compound still applied to the surface.

FIG. 4 illustrates a cross section through a cementitious substrate wherein a releasable adhesive compound in the form of a caulk 24 is applied to prevent coloring of the cementitious substrate in area 54, with areas 56 and 58 of the cementitious substrate having been colored by a coloring agent.

Figure 6:
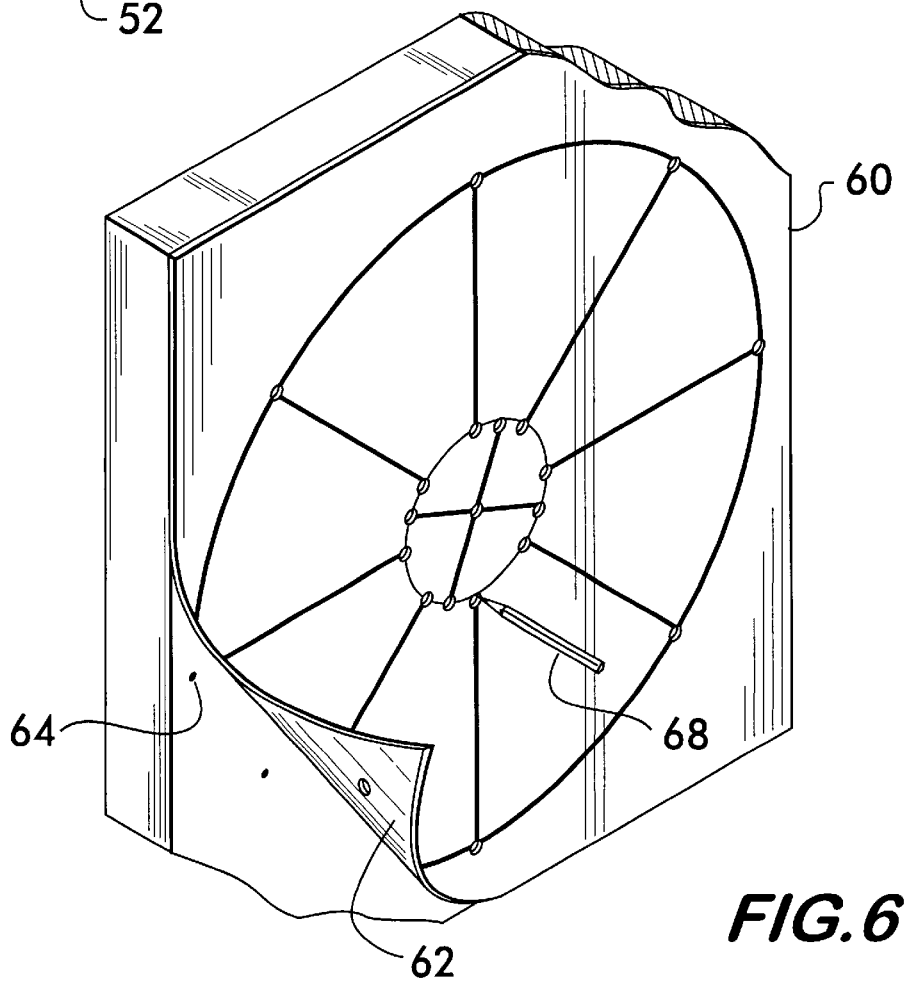
FIG. 6 is a view in perspective of a vertical cementitious substrate having a template thereon with markings being provided on the cementitious substrate through holes in the template.
Figure 7:
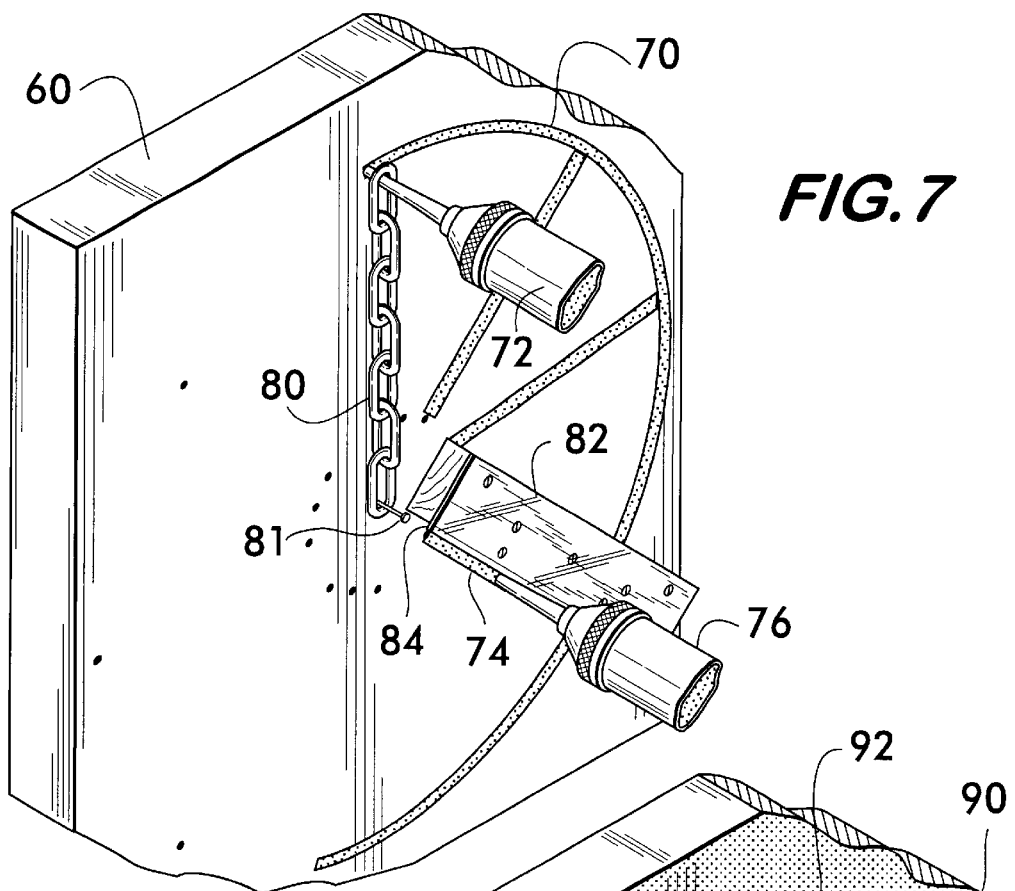
FIG. 7 illustrates a vertical cementitious substrate wherein dots formed by use of a template are being connected together utilizing a releasable adhesive compound in the form of caulk with the use of guide tools.
Figure 8:
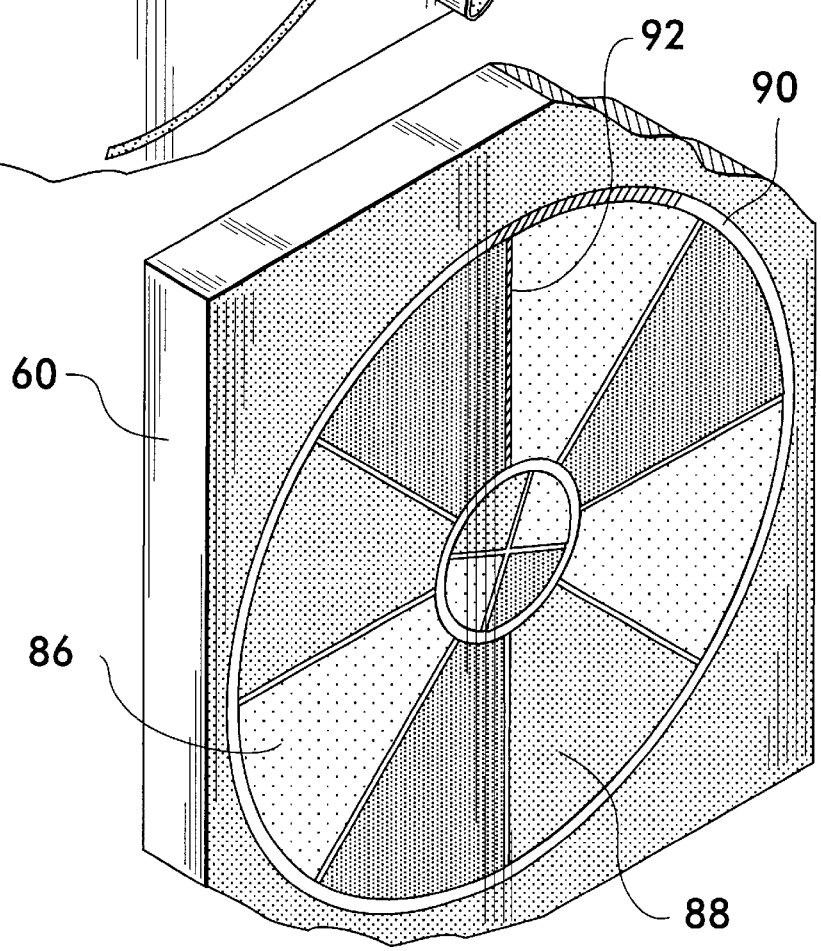
FIG. 8 illustrates a completed colored vertical cementitious substrate wherein a portion of the surface previously covered by the releasable adhesive compound is also colored.

Referring now to FIGS. 6 through 8, there is illustrated a vertical cementitious substrate 60 on which a template 62 is being utilize to form marks 64 by the use of a pencil or marker 68.

The marks 64 may be connected together utilizing caulk 70 from caulk gun 72 with the use of guide tool 80 and caulk 74 from caulk gun 76 using guide tool 82.

Guide tool 80 may be a link chain which may be utilized advantageously to form circular patterns. The tip of caulk gun 72 may be inserted through one of the links of the chain and another link spaced therefrom may be rotated around a pivot, such as nail 81 shown in FIG. 7 in the center of the circular pattern. Guide tool 82 is preferably a straight edge having a transparent guide 84 which is illustrated in FIG. 7 as in the form of a straight edge.

Once the releasable adhesive compound is applied to form the areas corresponding to the mortar or grout, coloring agents may be applied to various areas 86 and 88 as illustrated in FIG. 8. Again, with respect to FIG. 8 as with respect to FIGS. 1 through 5, the releasable adhesive compound may be removed before or after staining. If it is sealed before the releasable adhesive compound is removed, a coloring agent of a different color may be applied to the areas corresponding to mortar or grout areas 90 and 92 after removal of the releasable adhesive compound. If desired, after the areas corresponding to the mortar joint or grout are colored, the entire surface may be sealed again.

Figure 9:
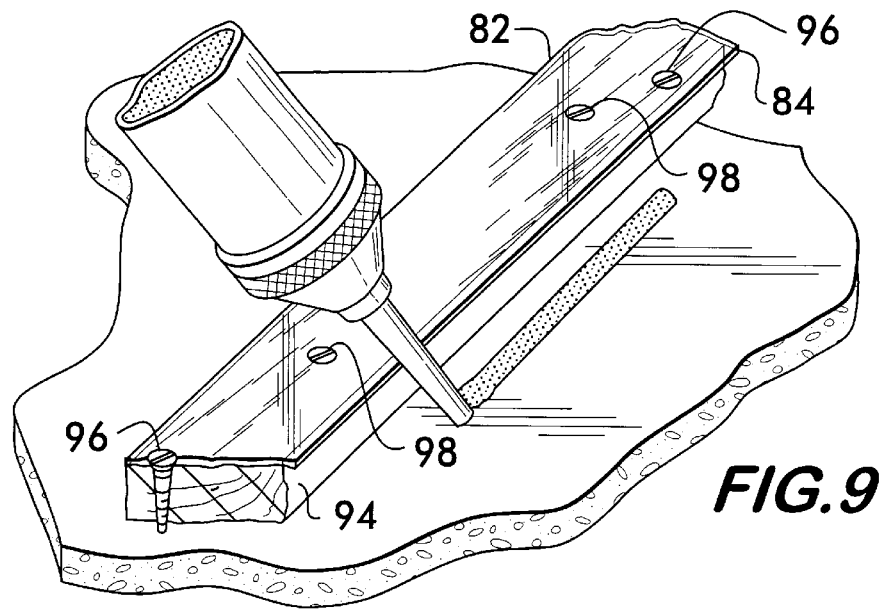
FIG. 9 is a view in perspective of a guide tool in accordance with the present invention being used in connection with a caulk gun.

Referring now to FIG. 9, there is shown a guide tool for use in coloring cementitious substrates which has an elongated body 94. Elongated body 94 is provided with a transparent member 84 attached to the elongated body for acting as a guide for a caulk gun. The entire guide tool is raised from the cementitious surface by means of projections 96 which project from the elongated body to keep the guide tool raised from the cementitious surface. The projections are preferably pointed so that the guide tool will be easily anchored to the cementitious surface by slightly digging into the cementitious surface and will not be easily moved during the application of the releasable adhesive caulk. The projections may be in the form of screws which are offset from the center so that the guide tool may be balanced on the cementitious surface. Other screws 98 along the center line illustrated in FIGS. 9 and 10 are used to hold transparent member 84 to body 94.

Figure 10:
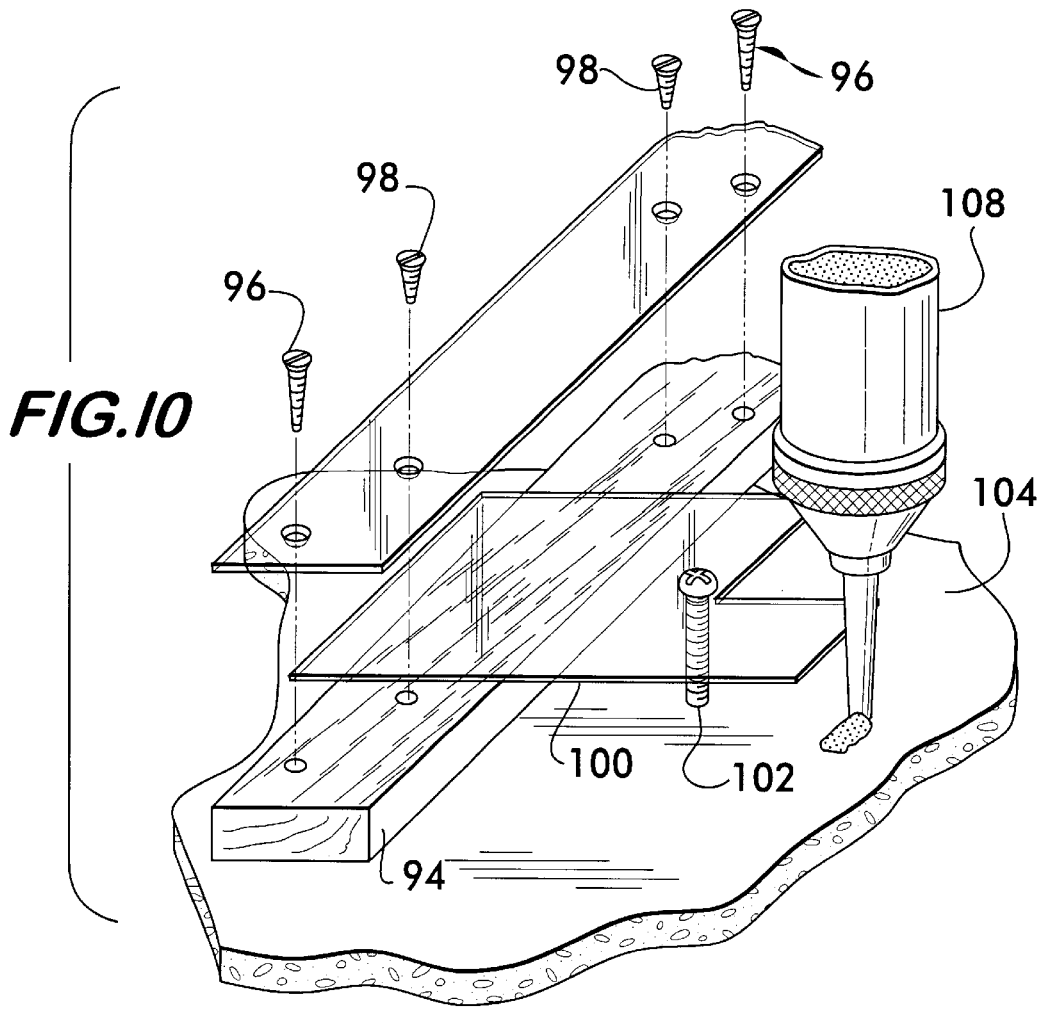
FIG. 10 is an exploded view in perspective of a guide tool in accordance with the present invention illustrating one of many particular designs.
Figure 11:
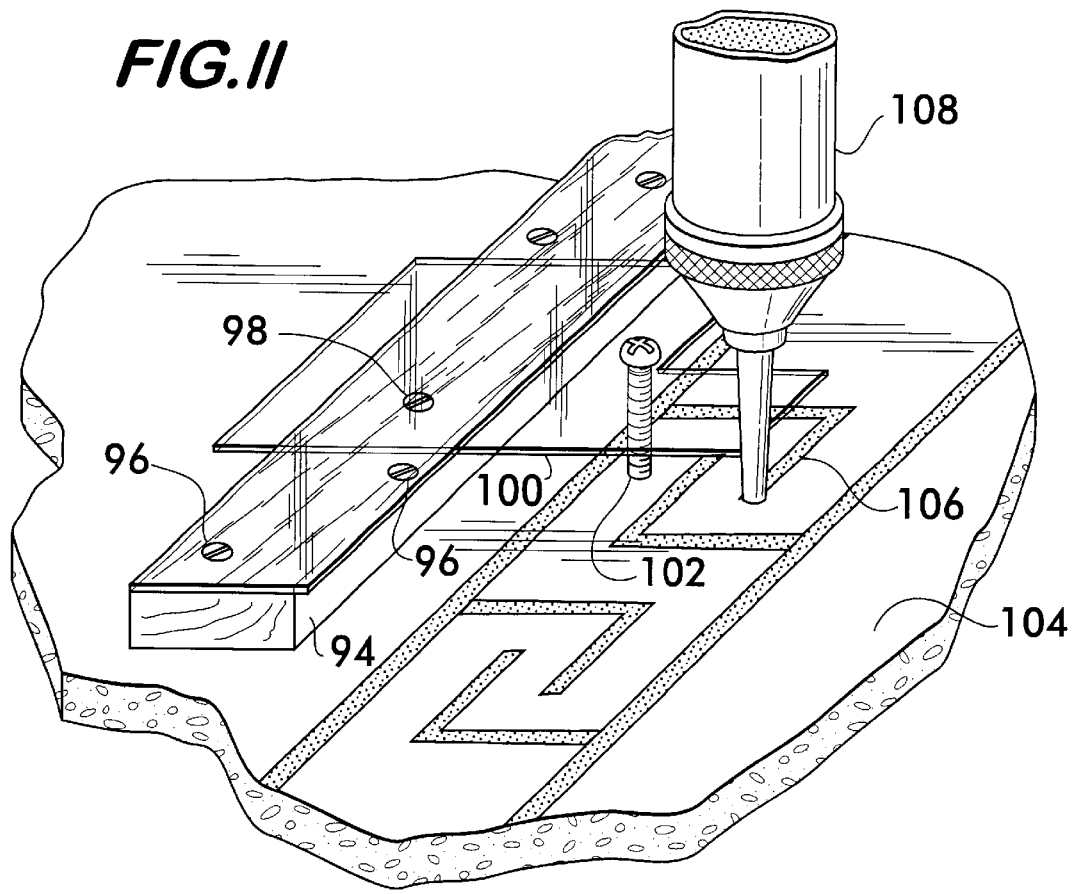
FIG. 11 is another view in perspective of a guide tool used for forming specific designs.

Referring now to FIG. 10, there is shown another embodiment of a guide tool wherein a particular design, such as a key design 100 is utilized. The design element, such as key design 100 may be secured by anchoring it between elongated body 94 and transparent member 84 by pressure as illustrated in FIGS. 10 and 11 or any other suitable mounting means. A screw or projection 102 is utilized to hold the particular design element above the cementitious surface 104. The design element 100 may be any particular design. A key design is illustrated in FIG. 10. However, this may be semi circular designs, oval designs or any other suitable design desired in a particular application. Projections on elongated body 94 in FIG. 10 also hold the entire guide tool raised from cementitious surface 104.

As illustrated in FIG. 11, a particularly design may be created utilizing the guide tool illustrated in FIG. 9. Releasable adhesive compound 106 is applied by caulk gun 108 by running it along the transparent key design 100 which is held raised from the surface by projection or screw 102.

Figure 12:
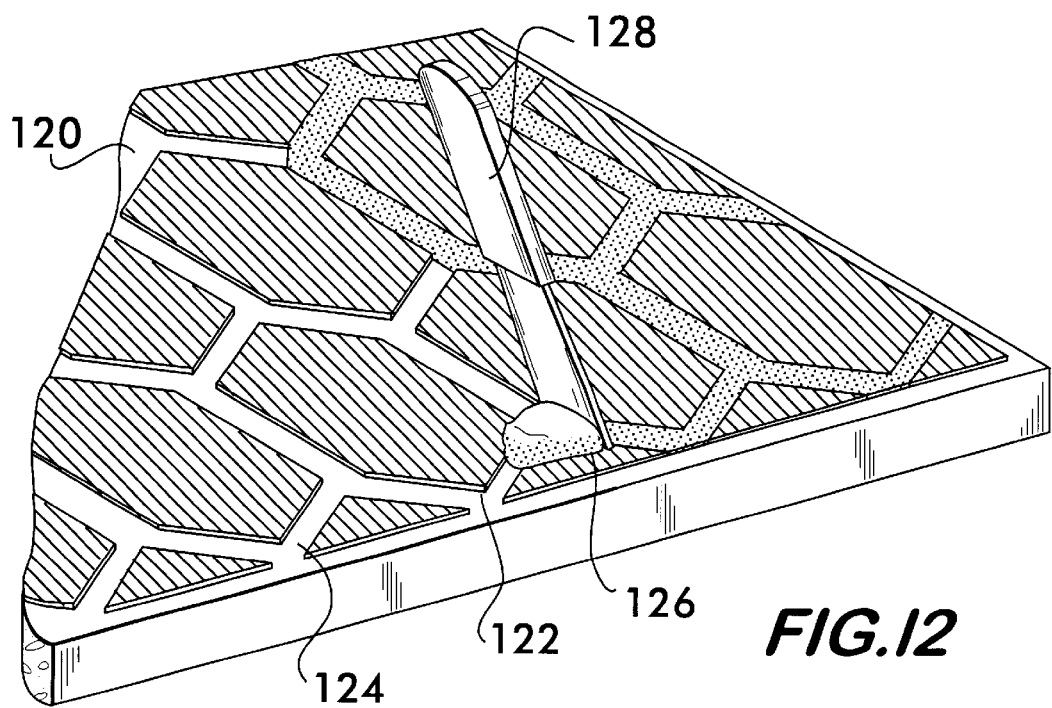
FIG. 12 is a view in perspective of a plurality of self sticking materials, each having a building material design, such as ceramic tile, applied in spaced relationship to provide grout or mortar lines, with a releasable adhesive compound being applied in the spaces between the materials.
Figure 13:
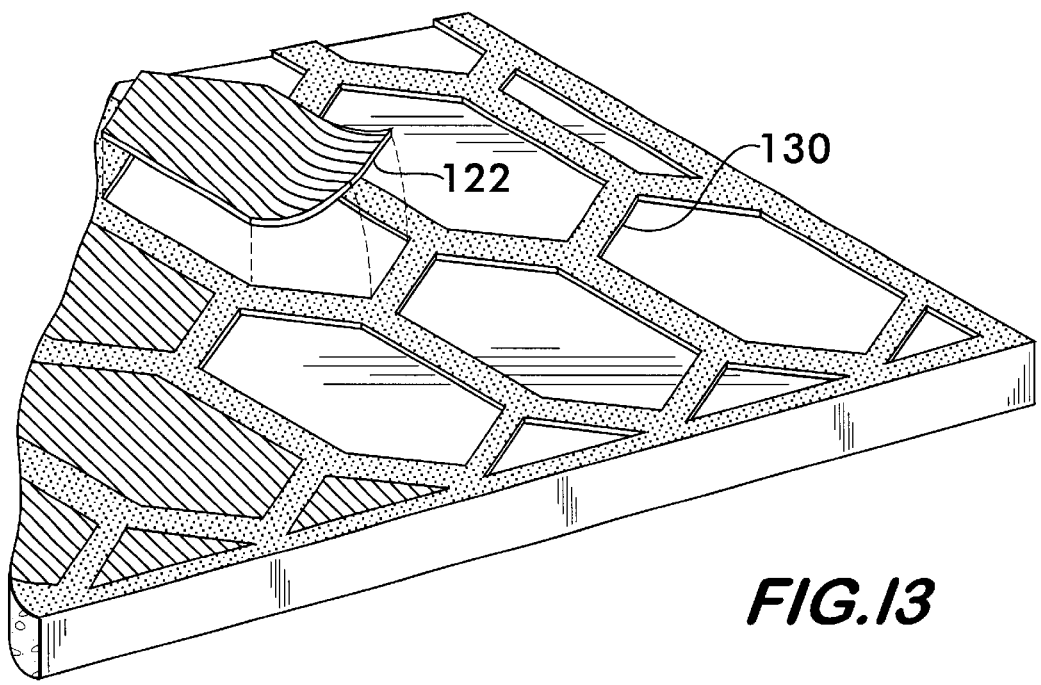
FIG. 13 is a view in perspective showing the materials being removed prior to the application of a coloring agent.
Figure 14:
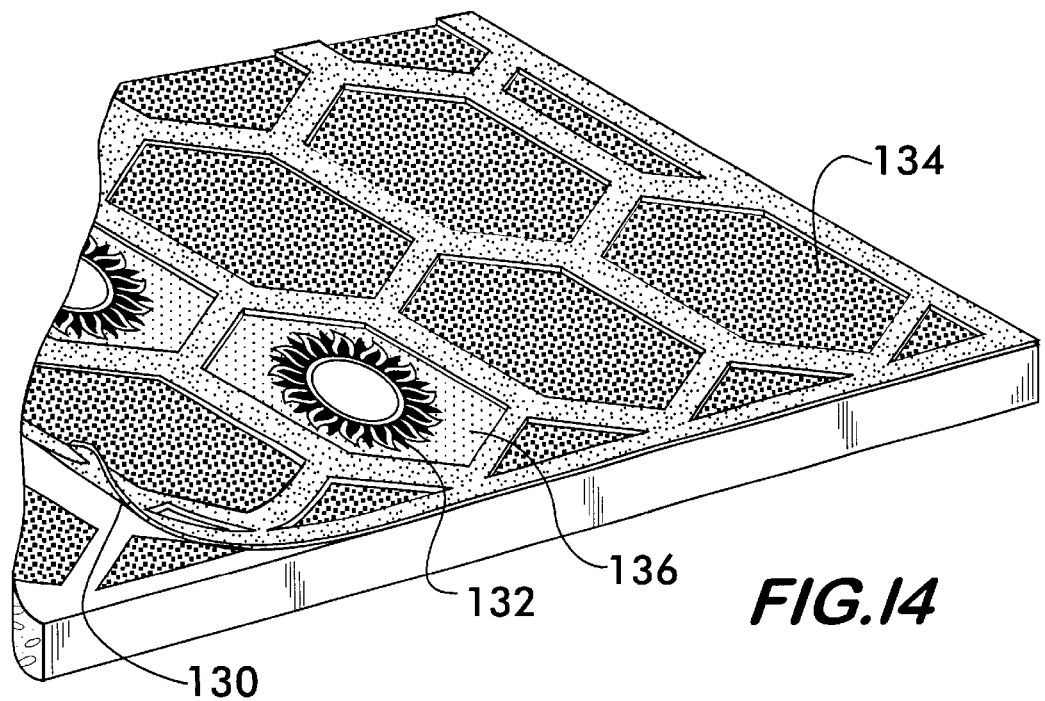
FIG. 14 is a view in perspective showing the releasable adhesive compound being removed to reveal the mortar joints between the colored tile areas.

Referring now to FIGS. 12, 13 and 14, there is shown a method in accordance with the present invention of creating the appearance of ceramic tile, brick or other similar building material on a cementitious surface.

There is shown in FIG. 12 a cementitious substrate 120 having applied thereto a plurality of materials 122 having a particular building material design. The plurality of building materials 122 may preferably be self sticking composition floor tiles such as vinyl floor tiles or cut from self sticking floor tiles or other sheet material having adhesive on one surface. Self sticking floor tiles may or may not be provided with a cover sheet to cover the self sticking adhesive, which cover sheet would be removed before application. The cover sheet may or may not be reapplied once the process is completed to enhance the reusability of self sticking floor tiles. However, it is understood that other suitable materials may be utilized to be temporarily applied to the cementitious surface in the form or shape of a building material such as brick or ceramic tile, including shapes cut from any material which may be held in place preferably by a temporary adhesive. In the particular case illustrated, the building material design is that of a ceramic tile. However, it is understood that various other designs may be utilized including brick. The building materials are applied to the cementitious surface in spaced relationship such that the spaces between the materials correspond to the typical spacing of grout or mortar joints 124. The plurality of materials 122 have a self sticking surface for releasable adhesion to cementitious surface 120. A releasable adhesive compound 126, such as caulk or a liquid scratch protectant applied at ambient temperature, is applied in the spaces corresponding to the grout or mortar joints 124. As illustrated in FIG. 12, this may be applied by a putty knife 128 or any other suitable applicator.

Once the releasable adhesive compound has been applied in the spaces corresponding to the mortar joints as illustrated at 130 in FIG. 13, the materials 122 in this case corresponding to ceramic tiles may be removed. The areas of the cementitious surface from which the materials have been removed are then colored utilizing a coloring agent. The coloring agent may be dammed between the releasable adhesive compound 130. All of the areas corresponding to the ceramic tiles may be colored the same color, or different areas may have different colors of coloring agent applied thereto as illustrated in FIG. 14 at 134 and 136 to produce a cementitious surface having the appearance of ceramic tiles of different colors. Often in the application of ceramic tiles, there are one or more rows of ceramic tile of a different color for contrast. These colored areas 134 and 136 as illustrated in FIG. 134 appear to have stippling, but this is an effect of attempts to illustrate colors in black and white drawings, it is understood that this will be substantially solid different colors except to the extent that there is an unevenness in the color of the coloring agent applied, which may produce some waviness or non uniformity in the color of the tile. The ceramic tiles may also have a design applied to them as illustrated at 132 in FIG. 14.

Once the coloring of the areas corresponding to the ceramic tile, brick or the like is completed, and the coloring agent has dried or cured, the releasable adhesive compound 130 may be peeled off as illustrated in the lower left hand corner of FIG. 14. The entire releasable adhesive compound 130 would be peeled off leaving bare or uncolored cementitious substrate which would appear to be a cementitious colored or light colored area corresponding to grout between the colored tiles.

As described previously, and if so desired, the areas corresponding to tile could be sealed before the removal of the releasable adhesive compound 130 and a different color of coloring agent applied to the areas corresponding to grout or mortar joints after removal of releasable adhesive compound 130.

The present invention may be embodied in other specific forms without departing from the spirit or essential attributes thereof and, accordingly, reference should be made to the appended claims, rather than to the foregoing specification as indicating the scope of the invention.

I claim:

1. A method of coloring a cementitious substrate, comprising:

applying a releasable adhesive compound directly to the cementitious substrate by caulking, spraying or brushing in a selected design to areas of the cementitious substrate which are desired not to be colored;

applying one or more coloring agents to areas of the cementitious substrate desired to be colored; and removing said releasable adhesive compound from said cementitious substrate.

2. A method in accordance with claim 1 including the step before removing said releasable adhesive compound from said cementitious substrate, the step of sealing the areas of said cementitious substrate where said one or more coloring agents have been applied.

3. A method in accordance with claim 2, after removing said releasable adhesive compound from said cementitious substrate, the step of applying a coloring agent to the area of the substrate previously covered by the releasable adhesive compound.

4. A method in accordance with claim 1 including the step of, as the first step, applying a stencil, said releasable adhesive compound then being applied through openings in said stencil.

5. A method in accordance with claim 1 wherein said releasable adhesive compound is a caulk which has sufficient adhesive properties to attach to the cementitious substrate, but may be removed or peeled off of the cementitious substrate.

6. A method in accordance with claim 5 wherein said caulk is applied to form a design corresponding to mortar joints, and said one or more coloring agents are dammed in areas of the substrate lying between lines of caulk.

7. A method in accordance with claim 5 where said caulk is supplied from a tube of caulk.

8. A method in accordance with claim 7 where straight lengths of caulk are applied using a straight edge tool.

9. A method in accordance with claim 8 where said straight edge tool has projections raising it from the cementitious substrate.

10. A method in accordance with claim 9 wherein the straightedge tool is made of transparent material at least along a straight edge portion of the tool.

11. A method in accordance with claim 7 where caulk is applied from said tube using a guide tool having a specific design.

12. A method in accordance with claim 11 wherein said guide tool has projections raising it from the cementitious substrate.

13. A method in accordance with claim 11 wherein said guide tool is comprised of a transparent material along at least a guide edge of the tool.

14. A method in accordance with claim 1 where the releasable adhesive compound is a liquid material which may be brushed or sprayed on areas of the cementitious substrate, adhering to the cementitious substrate as it solidifies and which may be subsequently removed from said cementitious substrate.

15. A method in accordance with claim 1 wherein said cementitious substrate is concrete.

16. A method in accordance with claim 1 wherein said cementitious substrate is a cement overlay.

17. A method in accordance with claim 1 wherein said cementitious substrate is a topping.

18. A method in accordance with claim 1 wherein said cementitious substrate is a texture spray.

19. A method in accordance with claim 1 wherein said selected design is formed by applying said releasable adhesive compound about the periphery of a design of a material having a self sticking surface for holding it in place on said cementitious surface.

20. A method in accordance with claim 19 wherein said design of said material is in the shape of a ceramic tile.

21. A method in accordance with claim 19 wherein said selected design comprises the periphery of a plurality of materials having a self sticking surface and the space in between said materials to create the appearance of grout lines between ceramic tiles, bricks or the like.

22. A method of creating on a cementitious surface a pattern of tiles or bricks with mortar joint therebetween, comprising:

applying a plurality of materials having a building material design in spaced relationship on a cementitious surface;

said plurality of materials having a self sticking surface for releasable adhesion to a cementitious surface;

said spaced relationship having a dimension of spacing corresponding to typical spacing of grout or mortar joints;

applying a releasable adhesive compound directly to the cementitious surface by caulking, spraying or brushing in spaces corresponding to the grout or mortar joints;

removing the plurality of materials;

applying a coloring agent to the area of cementitious substrate where the plurality of materials have been removed from; and removing the releasable adhesive compound to reveal a cementitious surface corresponding to grout or mortar joints.

23. A method of coloring a cementitious substrate, comprising:

applying a releasable adhesive caulk directly to the cementitious substrate at ambient temperature in a selected design to areas of the cementitious substrate which are desired not to be colored;

applying one or more coloring agents to areas of the cementitious substrate desired to be colored; and removing said releasable adhesive caulk from said cementitious substrate.

24. A method in accordance with claim 23 including the step before removing said releasable adhesive caulk from said cementitious substrate, the step of sealing the areas of said cementitious substrate where said one or more coloring agents have been applied.

25. A method in accordance with claim 24, after removing said releasable adhesive caulk from said cementitious substrate, the step of applying a coloring agent to the area of the substrate previously covered by the releasable adhesive caulk.

26. A method in accordance with claim 23 including the step of, as the first step, applying a stencil, said releasable adhesive caulk then being applied through openings in said stencil.

27. A method in accordance with claim 23 wherein said releasable adhesive caulk has sufficient adhesive properties to attach to the cementitious substrate, but may be removed or peeled off of the cementitious substrate.

28. A method in accordance with claim 27 wherein said caulk is applied to form a design corresponding to grout or mortar joints, and said one or more coloring agents are dammed in areas of the substrate lying between lines of caulk.

29. A method in accordance with claim 27 where said caulk is supplied from a tube of caulk.

30. A method in accordance with claim 29 where straight lengths of caulk are applied using a straight edge tool.

31. A method in accordance with claim 30 where said straight edge tool has projections raising it from the cementitious substrate.

32. A method in accordance with claim 31 wherein the straightedge tool is made of transparent material at least along a straight edge portion of the tool.

33. A method in accordance with claim 29 where caulk is applied from said tube using a guide tool having a specific design.

34. A method in accordance with claim 33 wherein said guide tool has projections raising it from the cementitious substrate.

35. A method in accordance with claim 33 wherein said guide tool is comprised of a transparent material along at least a guide edge of the tool.

36. A method in accordance with claim 23 wherein said cementitious substrate is concrete.

37. A method in accordance with claim 23 wherein said cementitious substrate is a cement overlay.

38. A method in accordance with claim 23 wherein said cementitious substrate is a topping.

39. A method in accordance with claim 23 wherein said cementitious substrate is a texture spray.

40. A method in accordance with claim 23 wherein said selected design is formed by applying said releasable adhesive caulk about the periphery of a design of a material having a self sticking surface for holding it in place on said cementitious surface.

41. A method in accordance with claim 40 wherein said design of said material is in the shape of a ceramic tile.

42. A method in accordance with claim 40 wherein said selected design comprises the periphery of a plurality of materials having a self sticking surface and the space in between said materials to create the appearance of grout or mortar lines between ceramic tiles, bricks or the like.

43. A method of coloring a cementitious substrate, comprising:

applying a compound consisting essentially of a releasable adhesive scratch protection compound directly to the cementitious substrate at ambient temperature in a selected design to areas of the cementitious substrate which are desired not to be colored;

applying one or more coloring agents to areas of the cementitious substrate desired to be colored; and removing said releasable adhesive scratch protection compound from said cementitious substrate.

44. A method in accordance with claim 43 including the step before removing said releasable adhesive scratch protection compound from said cementitious substrate, the step of sealing the areas of said cementitious substrate where said one or more coloring agents have been applied.

45. A method in accordance with claim 44, after removing said releasable adhesive compound from said cementitious substrate, the step of applying a coloring agent to the area of the substrate previously covered by the releasable adhesive scratch protection compound.

46. A method in accordance with claim 43 including the step of, as the first step, applying a stencil, said releasable adhesive scratch protection compound then being applied through openings in said stencil.

47. A method in accordance with claim 43 wherein said releasable adhesive scratch protection compound has sufficient adhesive properties to attach to the cementitious substrate, but may be removed or peeled off of the cementitious substrate.

48. A method in accordance with claim 47 wherein said adhesive scratch protection compound is applied to form a design corresponding to grout or mortar joints, and said one or more coloring agents are dammed in areas of the substrate lying between lines of adhesive scratch protection compound.

49. A method in accordance with claim 43 where the releasable adhesive scratch protection compound is a liquid material which may be brushed or sprayed on areas of the cementitious substrate, adhering to the cementitious substrate as it solidifies and which may be subsequently removed from said cementitious substrate.

50. A method in accordance with claim 43 wherein said cementitious substrate is concrete.

51. A method in accordance with claim 43 wherein said cementitious substrate is a cement overlay.

52. A method in accordance with claim 43 wherein said cementitious substrate is a topping.

53. A method in accordance with claim 43 wherein said cementitious substrate is texture spray.

54. A method in accordance with claim 43 wherein said selected design is formed by applying said releasable adhesive compound about the periphery of a design of a material having a self sticking surface for holding it in place on said cementitious surface.

55. A method in accordance with claim 54 wherein said design of said material is in the shape of a ceramic tile.

56. A method in accordance with claim 54 wherein said selected design comprises the periphery of a plurality of materials having a self sticking surface and the space in between said materials to create the appearance of grout or mortar lines between ceramic tiles, bricks or the like.

* * * * *